(12) United States Patent
Qtaishat et al.

(10) Patent No.: US 11,141,704 B2
(45) Date of Patent: Oct. 12, 2021

(54) COMPOSITE MIXED MATRIX MEMBRANES FOR MEMBRANE DISTILLATION AND RELATED METHODS OF MANUFACTURE

(75) Inventors: Moh'dRasool Qtaishat, Amman (JO); Mohamed Khayet, Madrid (ES); Takeshi Matsuura, Ottawa (CA); Saad Almuttiri, Jeddah (SA)

(73) Assignee: Membrane Distillation Desalination Ltd., Co., Amman (JO)

( * ) Notice: Subject to any disclaimer, the term of this patent is extended or adjusted under 35 U.S.C. 154(b) by 541 days.

(21) Appl. No.: 13/981,202

(22) PCT Filed: Jan. 19, 2012

(86) PCT No.: PCT/CA2012/000045
§ 371 (c)(1),
(2), (4) Date: Jan. 31, 2014

(87) PCT Pub. No.: WO2012/100326
PCT Pub. Date: Aug. 2, 2012

(65) Prior Publication Data
US 2014/0158610 A1 Jun. 12, 2014

(30) Foreign Application Priority Data
Jan. 24, 2011 (WO) ............... PCT/CA2011/000093

(51) Int. Cl.
*B01D 61/36* (2006.01)
*B01D 69/02* (2006.01)
(Continued)

(52) U.S. Cl.
CPC ......... *B01D 69/141* (2013.01); *B01D 61/364* (2013.01); *B01D 67/0011* (2013.01);
(Continued)

(58) Field of Classification Search
CPC ........ B01D 71/06; B01D 71/70; B01D 71/16; B01D 71/68; B01D 71/54; B01D 71/64;
(Continued)

(56) References Cited

U.S. PATENT DOCUMENTS 9,346,021 B2 * 5/2016 Qtaishat ............... B01D 61/364
2010/0224555 A1 * 9/2010 Hoek ................. B01D 67/0088
210/500.42

FOREIGN PATENT DOCUMENTS

IN WO 2009039467 A1 * 3/2009 ......... B01D 67/0088

OTHER PUBLICATIONS

M. Qtaishat, D. Rana, M. Khayet, T. Matsuura, Preparation and characterization of novel hydrophobic/hydrophilic polyetherimide composite membranes for desalination by direct contact membrane distillation, Journal of Membrane Science, vol. 327, Issues 1-2, Feb. 5, 2009, pp. 264-273, ISSN 0376-7388, http://dx.doi.org/10.1016/j.memsci.2008.11.*

(Continued)

*Primary Examiner* — Lucas A Stelling
*Assistant Examiner* — Angel Olivera
(74) *Attorney, Agent, or Firm* — Sughrue Mion, PLLC

(57) ABSTRACT

The present invention relates to a membrane distillation system comprising a flat-sheet composite mixed matrix hydrophilic/hydrophobic membrane having at least a hydrophilic layer and a hydrophobic layer. The hydrophilic layer comprises a hydrophilic polymer and inorganic nanoparticles having high thermal conductivity. The hydrophobic layer comprises fluorinated surface-modifying macromolecules (SMM). Also disclosed is a phase inversion method for manufacturing the membrane.

6 Claims, 12 Drawing Sheets

(51) Int. Cl.
*B01D 69/12* (2006.01)
*B01D 71/06* (2006.01)
*B01D 71/54* (2006.01)
*B01D 71/68* (2006.01)
*B01D 71/70* (2006.01)
*B01D 71/82* (2006.01)
*B01D 67/00* (2006.01)
*B01D 69/14* (2006.01)
*B01D 71/16* (2006.01)
*B01D 71/64* (2006.01)
*B29C 39/44* (2006.01)

(52) U.S. Cl.
CPC ..... *B01D 67/0013* (2013.01); *B01D 67/0079* (2013.01); *B01D 69/02* (2013.01); *B01D 69/12* (2013.01); *B01D 71/06* (2013.01); *B01D 71/16* (2013.01); *B01D 71/54* (2013.01); *B01D 71/64* (2013.01); *B01D 71/68* (2013.01); *B01D 71/70* (2013.01); *B01D 71/82* (2013.01); *B29C 39/44* (2013.01); *B01D 67/0016* (2013.01); *B01D 2323/42* (2013.01); *B01D 2325/22* (2013.01); *B01D 2325/36* (2013.01); *B01D 2325/38* (2013.01)

(58) Field of Classification Search
CPC .. B01D 67/0013; B01D 69/00; B01D 69/141; B01D 69/12; B01D 61/364; B01D 2325/36; B01D 2325/38; B01D 67/0079; B01D 69/02; B01D 71/82; B01D 67/0011; B01D 67/0016; B01D 2323/42; B01D 2325/22; B29C 39/44
See application file for complete search history.

(56) References Cited

OTHER PUBLICATIONS

Written Opinion of the ISR for PCT/CA2012/000045.*
M. Khayet et al., Morphological study of fluorinated asymmetric polyetherimide ultrafiltration membranes by surface modifying macromolecules, Journal of Membrane Science 213 (2003) 159-180.*

* cited by examiner nSMM1

SMM2

(MC3)

(MC4)

(MC5)

(MC6)

(MC8)

(MC9)

(MC10)

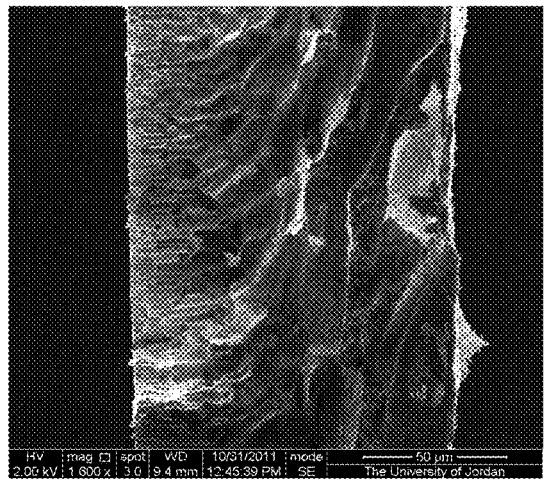
(MC 14)
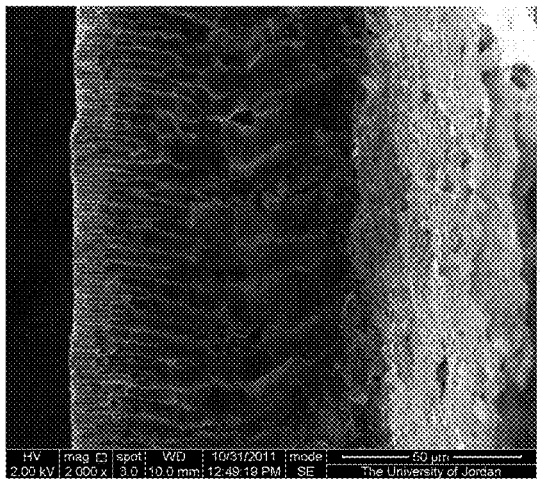
(MC16)
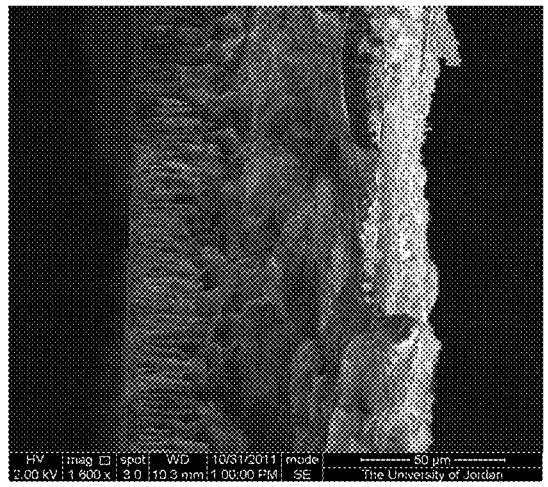
(MC21)
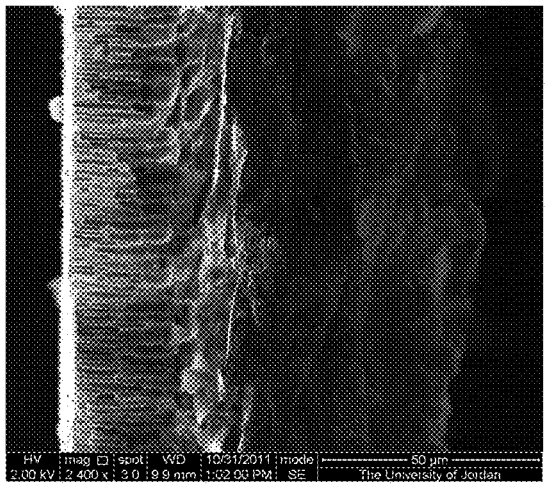
(MC22)
FIGURE 4, Continued MC17 Top MC17 Bottom (a)

(b)

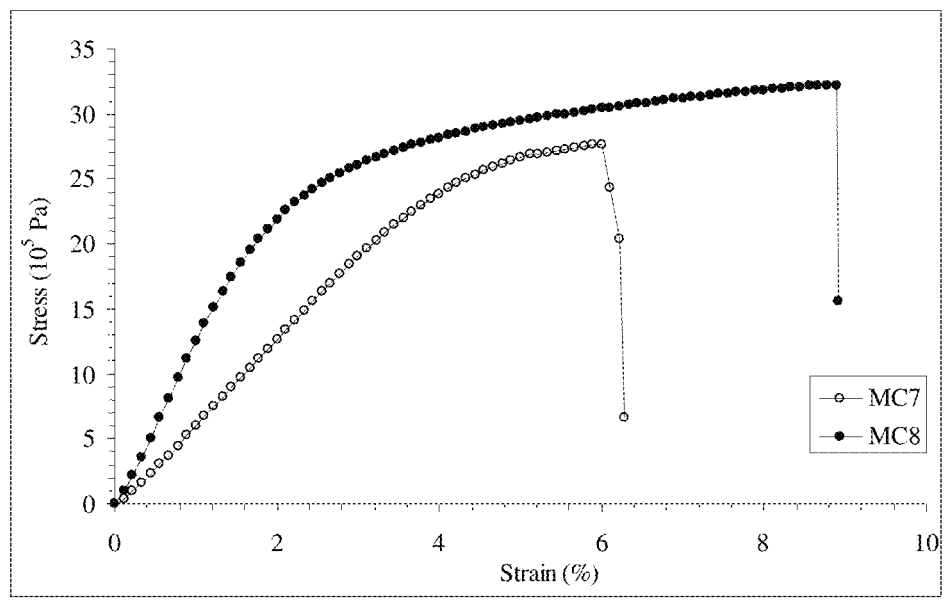
(c)
FIGURE 6, Continued (a)

(b)

(a)

(b)

(a)

(b)

COMPOSITE MIXED MATRIX MEMBRANES FOR MEMBRANE DISTILLATION AND RELATED METHODS OF MANUFACTURE

FIELD

The disclosed teachings pertain to the field of membranes for membrane distillation. More particularly, the disclosed teachings pertain to the field of mixed matrix hydrophobic/hydrophilic composite mixed matrix membranes.

REFERENCES

The following references are provided herein for additional background information and as such they are incorporated by reference.

Khayet, M., Membranes and theoretical modeling of membrane distillation: A review, Advances in Colloid and Interface Science, 164, 56-88, 2011.

Khayet, M., Matsuura, T., Membrane Distillation: Principles and Applications, Elsevier, Amsterdam (The Netherlands) 2011.

Qtaishat, M. R., Khayet, M., and Matsuura, T., Composite membranes for membrane distillation and related methods of manufacture. US Patent Application Publication No. 20110031100.

BACKGROUND

Membrane distillation (MD) is an emerging physical separation technology, which has been attracting researchers' attention in the last few decades (Khayet, 2011). MD is a thermally driven process where a microporous membrane acts as a physical support separating a warm solution from a cooler chamber containing either a liquid or a gas. As the process is non-isothermal, vapor molecules migrate through the membrane pores from the high vapor pressure membrane side (i.e. warm membrane side) to the low vapor pressure membrane side. This can be established following different configurations, i.e. direct contact membrane distillation, DCMD; air gap membrane distillation; AGMD; sweeping gas membrane distillation, SGMD and vacuum membrane distillation, VMD (Khayet, 2011).

An important requirement for the MD membrane is that the pores must not be wetted and only vapor is present in the pores. This requirement limits the choice of materials that can be used for MD. Notably MD membranes are limited to hydrophobic materials such as polytetrafluoroethylene (PTFE), polypropylene (PP), and polyvinylidene fluoride (PVDF). Although these membranes were manufactured for microfiltration and ultrafiltration purposes, they have been used in MD research due to their hydrophobic nature (Khayet, 2011).

MD holds several advantages compared to other separation processes. These advantages, mainly, are: up to 100% rejection of non-volatile solutes, lower operating temperatures than conventional distillation, lower operating pressures than conventional pressure-driven membrane separation processes such as reverse osmosis (RO) and reduced vapor spaces compared to conventional distillation processes. Despite all these advantages, MD process has not been commercialized yet for large scale plants. One of the reasons is the relatively lower MD flux and the membrane wetting, which diminishes the durability of MD membranes. As can be seen, the disadvantages arise from inadequate design of the MD membranes.

In the recent published book (Khayet & Matsuura, 2011), the requirements of higher permeate flux DCMD membranes are discussed. Hydrophobic/hydrophilic composite membranes for DCMD are also discussed in U.S. patent application Ser. No. 12/629,703 (Qtaishat, Khayet & Matsuura, 2011). In this application it is was shown that this type of membrane satisfies all the requirements of higher permeate flux DCMD membranes (Qtaishat, Khayet & Matsuura, 2011). The hydrophobic/hydrophilic membrane was prepared by the phase inversion method in a single casting step. A hydrophilic base polymer was blended with a hydrophobic surface modifying macromolecule (SMM). During the casting step, the SMM migrated to the air/polymer interface since they have lower surface energy (Qtaishat, Khayet & Matsuura, 2011). Consequently, the membrane top-layer became hydrophobic while the bottom layer was maintained hydrophilic. There remains a need for high permeate flux and durable membranes for use in DCMD.

This background information is provided for a better understanding of the disclosed teachings. It is not be construed as an admission that any of the above discussed information constitutes prior art against the present invention.

SUMMARY

An object of the present invention is to provide composite mixed matrix membranes for membrane distillation and related methods of manufacture that overcome the drawbacks, which hinder MD from being commercialized for large scale plants.

As a first aspect of the invention, there is provided a membrane distillation system comprising a flat-sheet composite mixed matrix hydrophilic/hydrophobic membrane having at least a hydrophilic layer and a hydrophobic layer. The hydrophilic layer further comprising a hydrophilic polymer and inorganic nano-particles of high thermal conductivity. The hydrophobic polymer layer further comprising fluorinated surface-modifying macromolecule (SMM).

Preferably, the hydrophilic polymer is a thermoplastic polymer and still preferably, it is selected from the group consisting of polysulfone, polyethersulfone, polyetherimide and cellulose acetate.

Preferably, the inorganic nano-particles are selected from the group consisting of copper oxide, boron nitride, aluminum nitride, aluminum, iron and silicone carbide.

Preferably, the hydrophobic polymer layer is made of fluorinated surface-modifying macromolecules (SMMs) synthesized using polyurethane chemistry and tailored with fluorinated end-groups. Preferably, the fluorinated SMM is blended with the hydrophilic polymer-inorganic nano-particles dispersion, The SMM is selected from the group consisting of poly(urethane propylene glycol) and poly(urea dimethylsiloxane urethane).

Preferably, the composite mixed matrix membrane has a high vapor permeate flux.

Preferably, the composite mixed matrix membrane has high mechanical properties.

Preferably, the composite mixed matrix membrane has a less wetting tendency, consequently high durability.

As a further aspect of the invention, there is provided a phase inversion method for manufacturing a membrane distillation composite mixed matrix hydrophilic/hydrophobic membrane, said method comprising dispersing a host hydrophilic polymer with a predetermined amount of insoluble inorganic nano-particles and a non-solvent additive in a solvent to form a polymer-inorganic solution. A fluorinated surface modifying macromolecule (SMM) is added to the polymer-inorganic solution to form a polymer-inorganic nano-particles SMM blend. The polymer-inorganic nano-particles blend is cast and said solvent is allowed to evaporate at room temperature for a predetermined time to form a cast film. A time of evaporation is varied systematically to study and modify an effect of the evaporation time on settling of the inorganic nano-particles in a bottom layer as well as the hydrophobic SMM migration to the top layer. The cast film is covered by a cover having a certain displacement to control evaporation of the solvent allowing more time for settling of the inorganic nano-particle in the bottom layer and migration of a hydrophobic SMM to the air/polymer interface. The cast film produced is immersed in water to allow gelation.

Preferably, the method of manufacturing a composite mixed matrix membrane further comprises maximizing porosity and minimizing thickness of the hydrophobic polymer layer of the composite membrane in order to increase the MD permeate flux of the composite membrane.

Preferably, the method of manufacturing a composite mixed matrix membrane further comprises maximizing thickness, porosity and thermal conductivity of the hydrophilic polymer layer.

Preferably, the host hydrophilic polymer comprises at least one of the polymers polysulfone, polyethersulfone, polytherimide and cellulose acetate.

Preferably, the inorganic nano-particles are selected from the group consisting of copper oxide, boron nitride, aluminum nitride, aluminum, iron and silicone carbide.

Preferably, the SMM is selected from the group consisting of poly(urethane propylene glycol) and poly(urea dimethylsiloxane urethane).

Preferably, the non-solvent additive is selected from the group consisting of γ-butyrolactone and ethanol.

Preferably, the solvent is selected from the group consisting of N,N-dimethylacetamide and 1-methyl-2-pyrrolidone.

BRIEF DESCRIPTION OF THE DRAWINGS

Further features and advantages of the present invention will become apparent from the following detailed description, taken in combination with the appended drawings, in which.

DETAILED DESCRIPTION

Unless defined otherwise, all technical and scientific terms used herein have the same meaning as commonly understood by one of ordinary skill in the art to which this invention belongs.

As used in the specification and claims, the singular forms "a", "an" and the "the" include plural references unless the context clearly dictates otherwise. The term "comprising" as used herein will be understood to mean that the list following is non-exhaustive and may or may not include any other additional suitable items, for example one or more further feature(s), component(s) and/or ingredient(s) as appropriate.

Figure 3:
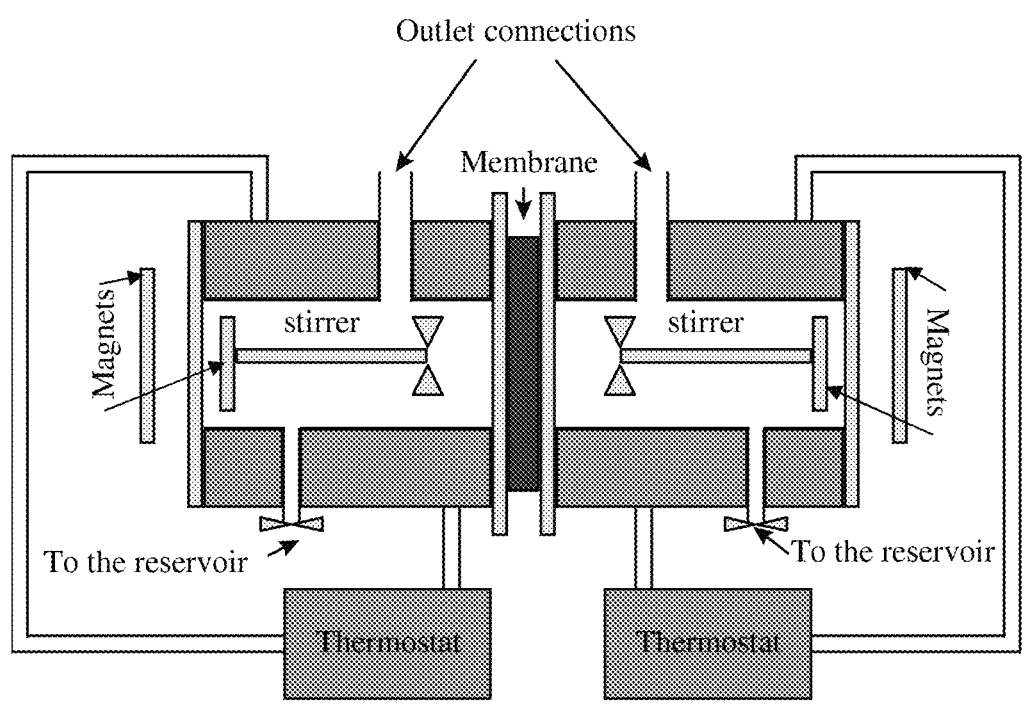
FIG. 3 is a schematic diagram of the experimental DCMD set-up.

FIG. 3. shows an exemplary membrane distillation system according to the disclosed teachings. The central part of the system is a stainless steel cell composed of two cylindrical chambers. One of the chambers is connected to a heating system through its jacket to control the temperature of the liquid feed. The other chamber is connected to a cooling system to control the temperature of the permeate. The membrane is placed between the two chambers (feed side and permeate side). The hot feed solution is brought into contact with the hydrophobic top layer of the membrane and the cold permeate solution is in contact with the hydrophilic part of the membrane. The effective membrane area is $2.75 \times 10^{-3}$ m$^2$. The bulk feed and permeate temperatures are measured, after steady state is reached, inside each chamber by a pair of sensors connected to a digital meter with an accuracy of ±0.1° C. Both the feed and permeate liquids are stirred inside the cell by graduated magnetic stirrers. The DCMD flux is calculated in every case by measuring the condensate collected in the permeate chamber for a predetermined period. The experiments are conducted first for pure water to determine the water vapour permeability of the membranes. Subsequently, aqueous solution of 0.5 M sodium chloride is employed as feed.

Figure 1:
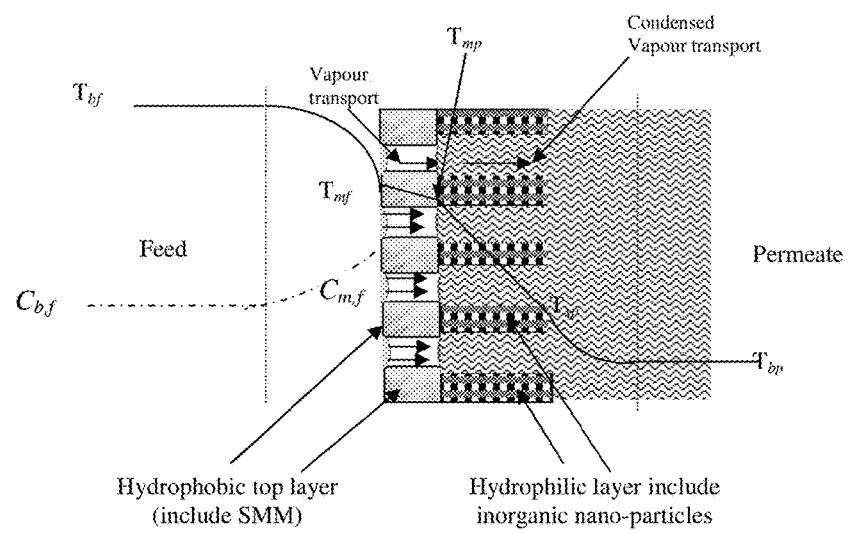
FIG. 1 is a schematic of the DCMD mechanism of transport through a porous composite mixed matrix hydrophobic/hydrophilic membrane.

FIG. 1 shows an exemplary composite mixed matrix membrane according to the disclosed teachings. As shown, the membrane is a hydrophilic/hydrophobic membrane. It has a hydrophilic layer and a hydrophobic layer. The hydrophilic layer has a hydrophilic polymer and inorganic nano-particles of high thermal conductivity. The hydrophobic layer has fluorinated surface-modifying macromolecule (SMM).

In general, membranes for use in MD should allow a high permeate flux. As it is well known, a MD membrane must be porous and hydrophobic, with good thermal stability and excellent chemical resistance to feed solutions. The characteristics needed for DCMD membranes are as follows:

High Liquid Entry Pressure (LEP)

This is the minimum hydrostatic pressure that must be applied to the liquid feed solution before it overcomes the hydrophobic forces of the membrane and penetrates into the membrane pores. LEP is characteristic of each membrane and prevents wetting of the membrane pores when it is high. High LEP may be achieved using a membrane material with high hydrophobicity (i.e. large water contact angle) and a small maximum pore size. However, as the maximum pore size decreases, the mean pore size of the membrane decreases and the permeability of the membrane become low.

High Permeability

The permeate flux will "increase" with an increase in the membrane pore size and porosity, and with a decrease of the membrane thickness and pore tortuosity. In other words, to obtain a high permeability, the surface layer that governs the membrane transport must be as thin as possible and its surface porosity as well as pore size must be as large as possible. However, it must be mentioned here that there exists a critical pore size equal to the mean free path of water vapor molecules for given experimental DCMD conditions. In DCMD process, air is always trapped within the membrane pores with pressure values close to the atmospheric pressure. Therefore, if the pore size is comparable to the mean free path of water vapor molecules, the molecules of water vapor collide with each other and diffuse among the air molecules. In this case, the vapor transport takes place via the combined Knudsen/molecular diffusion flow. On the other hand, if the pore size is smaller than the mean free path of water vapor molecules, the molecule-pore wall collisions become dominant and the Knudsen type of flow will be responsible for the mass transport in DCMD. It should be noted that for given experimental conditions, the calculated DCMD flux based on Knudsen mechanism is higher than that based on the combined Knudsen/molecular diffusion mechanism.

Under a certain operating condition, it would be better to use membranes with lower pore sizes than the corresponding mean free path of water vapor molecules so that the Knudsen type of flow will take place, leading to higher DCMD permeate flux compared to that of the membranes with larger pore sizes where the combined Knudsen/molecular diffusion flux is responsible for mass transfer. Therefore, care must be taken to choose the appropriate membrane pore size, taking into account the value of the mean free path of water vapor molecules so that the membrane can work under the Knudsen type of flow.

Low Thermal Conductivity of the Hydrophobic Layer

In MD heat loss by conduction occurs through both the pores and the hydrophobic matrix of the membrane. The conductive heat loss is greater for thinner membranes layers. Various possibilities may be applied to diminish the conductive heat loss by using:

i) a membrane material of the hydrophobic layer with low thermal conductivity. This does not necessarily guarantee the improvement of the MD process because most hydrophobic polymers have similar heat conductivities, at least in the same order of magnitude.

ii) a membrane layer with high porosity, since the conductive heat transfer coefficient of the gas entrapped within the membrane pores is an order of magnitude smaller than that of the membrane matrix. This possibility is parallel to the need of high permeability as the available surface area of evaporation is enhanced with an increase in porosity.

iii) a thicker membrane layer. However, there is a conflict between the requirements of high mass transfer associated with thinner membranes and low conductive heat transfer through the membrane obtained by using thicker membranes.

High Thermal Conductivity of the Hydrophilic Layer

The increase of the thermal conductivity of the hydrophilic sub-layer material will increase the DCMD permeate flux.

The hydrophilic layer thermal conductivity should be as high as possible. The reason is that the temperature gradient across the hydrophobic layer (in FIG. 1) becomes steeper with an increase in the thermal conductivity of the hydrophilic layer, as a result, the temperature polarization coefficient (TPC) defined below in Eq. 3 also increases.

$$TPC = \frac{T_{m,f} - T_{m,p}}{T_{b,f} - T_{b,p}} \quad (3)$$

Mixed matrix composite porous hydrophobic/hydrophilic membranes, having a very thin hydrophobic layer responsible for the mass transfer and a thick hydrophilic layer of a high thermal conductivity for diminishing the temperature polarization effect, are thus required. This seems to be a relatively simple solution that fulfills all the above conditions for achieving high permeable and durable membrane.

Theoretical Background of the Importance of Using Mixed Matrix Membranes in Membrane Distillation The system to be studied consists of a mixed matrix composite hydrophobic/hydrophilic membrane maintained between hot pure water, named hereafter the feed side, and cold pure water, the permeate side. The hydrophobic side of the membrane is brought into contact with the hot feed water, while the hydrophilic-layer of the membrane is maintained in contact with cold water, which penetrates into the pores of the hydrophilic-layer. On the contrary, the pores of the hydrophobic-layer are maintained dry unless the applied transmembrane pressure exceeds the liquid entry pressure of water (LEP) of the membrane. Under this condition, liquid/liquid interfaces formed at both ends of the pores of the hydrophobic-layer are as can be seen in FIG. 1.

The temperature drop established through the pores of the hydrophobic-layer will create a vapor pressure difference, which is the driving force in DCMD process. In this case, evaporation takes place at the hot feed side and, after water vapor is transported through the pores of the hydrophobic-layer, condensation takes place at the vapor/liquid interface formed at the boundary between the hydrophobic and the hydrophilic layers.

In the described system, both mass and heat transfer occurs simultaneously across the membrane. Consequently, the temperatures at the membrane surfaces differ from those at the bulk phases of the solution leading to a decrease of the driving force and consequentely a decrease of the DCMD permeate flux. This is called temperature polarization effect.

The heat transfer within the membrane involves the latent heat required for water evaporation at the hot feed liquid/vapor interface, and the heat transferred by conduction through the gas-filled pores of the hydrophobic top-layer of the membrane, the liquid-filled pores of the hydrophilic sub-layer of the membrane and the whole membrane matrix (i.e. both hydrophobic and hydrophilic polymer layers). In addition, heat transfer occurs through the adjoining liquid phases, both on the feed and permeate sides. Thus, the following equations may be applied.

$$Q_f = h_f(T_{b,f} - T_{m,f}) \quad (1)$$

$$Q_t = h_t(T_{m,f} - T_{m,p}) + J_w \Delta H_v \quad (2)$$

$$Q_s = h_s(T_{m,p} - T_{s,p}) \quad (3)$$

$$Q_p = h_p(T_{s,p} - T_{b,p}) \quad (4)$$

At steady state, the heat flux must be the same throughout the whole DCMD system.

$$Q = Q_f = Q_t = Q_s = Q_p \quad (5)$$

where Q is the heat flux through each phase, h is the heat transfer coefficient, $J_w$, is the permeate flux, $\Delta H_v$ is the latent heat of vaporization and T is the absolute temperature. The subscripts b, f, p, m and s refer to the bulk solution, feed, permeate, hydrophobic top-layer of the membrane and its hydrophilic sub-layer, respectively. The heat transfer through the top hydrophobic-layer is indicated by the subscript t, while that transferred through the hydrophilic sub-layer is indicated by the subscript s.

On the other hand, the temperature polarization coefficient ($\theta$) can be defined as:

$$\theta = \frac{\Delta T_m}{\Delta T_b} = \frac{T_{m,f} - T_{m,p}}{T_{b,f} - T_{b,p}} \quad (6)$$

Therefore, from the above equations, the heat flux can be written as follows:

$$Q = \left(\frac{1}{h_f} + \frac{1}{h_s} + \frac{1}{h_p}\right)^{-1} (1 - \theta)(T_{b,f} - T_{b,p}) \quad (7)$$

or $$Q = \left(\frac{1}{h_f} + \frac{1}{h_t + \frac{J_w \Delta H_v}{T_{m,f} - T_{m,p}}} + \frac{1}{h_s} + \frac{1}{h_p}\right)^{-1} (T_{b,f} - T_{b,p}) \quad (8)$$

As a result the overall heat transfer coefficient (U) for the DCMD process may be written:

$$U = \left(\frac{\frac{1}{h_f} +}{h_t + \frac{J_w \Delta H_v}{T_{m,f} - T_{m,p}}} + \frac{1}{h_s} + \frac{1}{h_p}\right)^{-1} = \left(\frac{1}{h_f} + \frac{1}{h_s} + \frac{1}{h_p}\right)^{-1} (1 - \theta) \quad (9)$$

and the temperature polarization coefficient $\theta$ might be expressed as:

$$\theta = \frac{T_{m,f} - T_{m,p}}{T_{b,f} - T_{b,p}} = 1 - \frac{U}{h} \quad (10)$$

where h is the overall heat transfer coefficient valid for the hot feed phase, hydrophilic sub-layer and cold permeate phase:

$$h = \frac{h_f h_p h_s}{h_f h_p + h_p h_f + h_s h_f} \quad (11)$$

Equations 10 and 11 may be rearranged as:

$$\theta = \theta_f + \theta_p + \theta_s - 2 \quad (12)$$

where $\theta_f$, $\theta_x$, and $\theta_p$ are the temperature polarization coefficients corresponding to the feed, hydrophilic sublayer and permeate phases, respectively; and are defined in Eqs. (13-15) as follows.

$$\theta_f = 1 - \frac{U}{h_f} = \frac{T_{m,f} - T_{m,p}}{T_{b,f} - T_{b,p}} \quad (13)$$

$$\theta_s = 1 - \frac{U}{h_s} = \frac{(T_{b,f} - T_{b,p}) - (T_{m,p} - T_{s,p})}{T_{b,f} - T_{b,p}} \quad (14)$$

$$\theta_p = 1 - \frac{U}{h_p} = \frac{T_{b,f} - T_{s,p}}{T_{b,f} - T_{b,p}} \quad (15)$$

DCMD process is controlled by a mass transfer through the membrane and a heat transfer through the composite system formed by the membrane plus the adjoining liquid layers. Both mechanisms are interrelated. In principle six possibilities may occur:

1) If the heat transfers through the feed, hydrophilic sublayer and permeate are very large, the temperatures at the membrane surfaces approach to the corresponding temperatures in the bulk phases. This means that the temperature polarization coefficients, $\theta_f$, $\theta_s$ and $\theta_p$, (see Eqs. 13-15), as well as the overall temperature polarization coefficient, $\theta$, approach unity (see Eq. 12).

2) If feed, hydrophilic sublayer and permeate heat transfer coefficients are small, the differences between the temperatures at the membrane surfaces and the temperatures corresponding to the bulk phases are high. This means that the temperature polarization coefficient, 9, approaches zero (see Eq. 10). In this case, the temperature polarization effects are very important and the heat transfer resistances of the adjoining layers control the DCMD process.

3) If the permeate and hydrophilic sublayer heat transfer coefficients are very large in comparison to the feed heat transfer coefficient, the temperature at the permeate membrane surface ($T_{s,p}$) is similar to the corresponding temperature at the bulk phase ($T_{b,p}$). The hydrophobic top-layer of the membrane ($T_{m,p}$) and its hydrophilic sub-layer ($T_{s,p}$) become very similar too. This means that the permeate and hydrophilic sublayer temperature polarization coefficients, $\theta_s$ and $\theta_p$, approach unity (see Eqs. 14 and 15). In this case, Eq. 12 shows that the overall temperature polarization coefficient is similar to the temperature polarization coefficient in the feed side, $\theta_f$.

4) If the feed and hydrophilic sublayer sides heat transfer coefficients are very large, the temperature at the feed side membrane surface ($T_{m,f}$) become very similar to the bulk phase temperature ($T_{b,f}$) and the temperature at the hydrophobic top-layer of the membrane ($T_{m,p}$) and its hydrophilic sub-layer ($T_{s,p}$) become very similar too. From Eqs. 13 and 14 the feed temperature polarization coefficient, $\theta_f$, and the hydrophilic sublayer temperature polarization coefficients approach unity. In this case, the temperature polarization coefficient in the permeate side ($\theta_p$) is important and is similar to the overall temperature polarization coefficient, $\theta$.

5) If the heat transfers through the feed and permeate are very large, the temperatures at the membrane surfaces approach to the corresponding temperatures in the bulk phases. This means that the temperature polarization coefficients, $\theta_f$ and $\theta_p$, (see Eqs. 13 and 14) approach unity and the temperature polarization coefficient in the hydrophilic sublayer ($\theta_s$) is important and is similar to the overall temperature polarization coefficient, $\theta$ (see Eq. 12).

6) If the heat transfer coefficient is very large in one of the layers, while the heat transfer coefficients in the other two layers were small, then the temperature polarization coefficient in the layer where the heat transfer coefficient is large approach unity and the other two layers temperature polarization coefficients will control the value of the overall temperature polarization coefficient, $\theta$ according to Eq. 12.

The latter possibility is the only possibility that a membrane designer could alter. That is, an increase of the heat transfer by conduction of the hydrophilic sub-layer. Increase of $h_s$. The prepared mixed matrix composite membranes of high thermal conductivity of the hydrophilic sublayer could satisfy this possibility, which explains the high permeate flux result since the heat transfer resistance in the membrane sublayer is significantly reduced. As a result the temperature polarization factor of the sublayer ($\theta_s$) approached unity.

Composite Mixed Matrix Membranes:

The composite mixed matrix membranes of the present invention comprise a hydrophilic layer and a hydrophobic layer. The hydrophobic layer prevents water penetration into its pores and is relatively thin, thereby minimizing the resistance to mass transfer.

The composite membranes are prepared using fluorinated surface-modifying macromolecules (SMMs), which migrate to the air-film surface during membrane formation according to thermodynamic principles and form an amphipathic structure (hydrophobic/hydrophilic/hydrophobic). The SMMs used in the preparation of these membranes are oligomeric fluoropolymers synthesized using polyurethane chemistry and tailored with fluorinated end-groups. Particularly, SMM is selected from the group consisting of poly(urethane propylene glycol) and poly(urea dimethylsiloxane urethane).

The hydrophilic bulk membrane phase is prepared by blending a polymeric material with inorganic nano-particles of high thermal conductivity. This hydrophilic phase should be blended with the SMMs. Suitable hydrophilic polymers are thermoplastic polymers. In particular, they include, but are not limited to, polysulfone, polyethersulfone, polyetherimide and cellulose acetate. Suitable mixed matrix nano-particles include, but are not limited to, boron nitride, copper oxide, aluminum nitride, aluminum, iron and silicone carbide.

Manufacture of Composite Mixed Matrix Membranes

In accordance with an advantageous embodiment of the present invention, the composite mixed matrix membranes of the present invention are manufactured using a phase inversion method, in a single casting step, in which a polymer dope solution is prepared that includes predetermined amounts of hydrophilic polymer and hydrophobic SMM dissolved into solvent/non-solvent, mixture. Then the inorganic nano-particles are dispersed into the polymer dope solution to form the polymeric/inorganic nano-particles dope blend. This blend is then cast on a glass plate and allowed to evaporate at room temperature; however the solvent evaporation is controlled by covering the cast film with a glass cover. During the controlled solvent evaporation; the hydrophobic SMM migrates to the air/polymer interface (i.e. the top layer), since it has lower surface energy. On the other hand, the inorganic nano-particles settle down in the bottom hydrophilic layer rising its thermal conductivity. Alternative methods can be used to prepare the composite mixed matrix membranes, however, SMM surface migration and inorganic nano-particles settling are critical to preparation of the membranes of the present invention and the phase inversion method is the simplest and cheapest method currently known.

Phase inversion is a process in which a polymer is transformed from a liquid to a solid state. There are a number of methods to achieve phase inversion. Among others, the dry-wet phase inversion technique and the temperature induced phase separation (TIPS) are most commonly used in the industrial membrane manufacturing. The dry-wet phase inversion technique was applied by Loeb and Sourirajan in their development of the first cellulose acetate membrane for seawater desalination. Therefore, this method is often called the Loeb-Sourirajan method.

According to the Loeb-Sourirajan method, a polymer solution is prepared by mixing polymer, solvent and sometimes even non-solvent. The solution is then cast on a suitable surface by a doctor blade to a predetermined thickness (50-250 µm). After partial evaporation of the solvent, the cast film is immersed in a bath of non-solvent medium, often called gelation medium. Due to a sequence of two dissolution steps, i.e., evaporation of solvent and solvent/non-solvent exchange in the gelation bath, solidification of polymer film takes place. It is desirable to choose a solvent of strong dissolving power with high volatility. During the first step of desolvation by solvent evaporation, a thin skin layer of solid polymer is formed instantly at the top of the cast film due to the loss of solvent. In the solvent/non-solvent exchange process that follows, non-solvent diffuses into, while solvent diffuses out of, the polymer solution film through the thin solid layer.

At some point in the process, the content of solvent in the solution film becomes so low that the solvent no longer is able to hold polymer in one phase. Phase separation takes place at this point, forming droplets of one liquid phase dispersed in the other continuous liquid phase. The point of phase separation, and the size and the number of the dispersed droplets depend on the nature of solvent and non-solvent and the polymer solution composition. The control of the number and the size of the droplets will eventually control the structure of the porous substrate.

The thin layer of solid polymer that forms during the first evaporation step becomes the top skin layer that will govern the selectivity and the permeate flux of the membrane, while the porous structure that forms during the solvent/non-solvent extraction step becomes the porous sub-layer, providing the mechanical strength, an advantageous characteristic. Hence, the membrane obtained is an integrally skinned asymmetric membrane.

Characteristics of the Mixed Matrix Membranes:

A composite mixed matrix membrane of high hydrophilic layer thermal conductivity is presented. This novel type of membrane exhibit higher permeate fluxes than those of composite polymeric membranes prepared without dispersed inorganic nano-particles. Furthermore, the mechanical properties like mechanical strength of the mixed matrix composite membranes were much better than the composite polymeric membranes. They also have lower wetting tendency than commercial membranes of single hydrophobic layer.

Application of the Composite Mixed Matrix Membranes:

The composite mixed matrix membranes of the present invention are particularly useful in direct contact membrane distillation (DCMD).

The proposed composite mixed matrix membranes can be used for seawater desalination, wastewater treatment, food processing, concentration of pharmaceutical products, etc.

To gain a better understanding of the invention described herein, the following membrane examples are set forth. It should be understood that these examples are for illustrative purposes only. Therefore, it should not limit the scope of this invention in any way.

MEMBRANE EXAMPLES: Preparation and Characterization of Composite Mixed Matrix Membranes for Desalination by Direct Contact Membrane Distillation Different composite mixed matrix membranes were prepared using different types of inorganic nano-particles including, copper oxide, aluminum nitride, boron nitride, aluminum, iron and silicone carbide. Moreover, different hydrophilic polymer types and concentrations were used in preparing the composite mixed matrix membranes. The effect of using the inorganic nano-particles on the membrane morphology and desalination performance of these membranes in MD was clearly identified.

The morphology of the prepared composite mixed matrix membranes, mechanical properties and DCMD performance were studied using different characterization techniques and compared to the composite membranes prepared without the dispersion of inorganic nano-particles. The composite mixed matrix membranes exhibit better mechanical properties and performance for practical application in desalination by DCMD.

Experimental

Materials

All chemicals used in this work and their chemical abstract service (CAS) number are summarized in Table 1. The average molecular weight ($M_w$) of the used polysulfone (PS) and polyethersulfone (PES) is 79000 g/mol 30800 g/mol, respectively.

TABLE 1

Materials Used in this Example

| Material description | CAS number | Source |
|---|---|---|
| 4,4'-Methylene bis(phenyl isocyanate) (MDI, 98%) | 101-68-8 | Sigma-Aldrich, Inc., St. Louis, MO, USA |
| α,ω-Aminopropyl poly(di-methyl siloxane) (PDMS) of average molecular weight 900 | 106214-84-0 | Shin-Etsu Chemical Co. Ltd., Tokyo, Japan |
| 4,4'-Solfonyldiphenol (Dihydroxy diphenyl sulfone, DPS, 98%) | 80-09-1 | Sigma-Aldrich, Inc., St. Louis, MO, USA |
| Zonyl BA-L ™ (BAL) of average $M_n$ 443 and 70 wt % fluorine | 678-39-7 | DuPont product supplied by Aldrich Chemical Company, Inc., Milwaukee, WI, USA |
| N,N-Dimethylacetamide (DMAc, anhydrous 99.8%) | 127-19-5 | Sigma-Aldrich, Inc., St. Louis, MO, USA |
| 1-Methyl-2-pyrrolidinone (NMP, anhydrous 99.5%) | 112-14-1 | Sigma-Aldrich, Inc., St. Louis, MO, USA |
| Ethanol (anhydrous, 99+%) | 64-17-5 | Aldrich Chemical Company, Inc., Milwaukee, WI, USA |
| Tetrahydrofuran (THF, HPLC grade 99.9%) | 109-99-9 | Aldrich Chemical Company, Inc., Milwaukee, WI, USA |
| Polysulfone (PS, UDEL ™ 3500) Specific gravity: 1.24 | 25154-01-2 | Solvay Advanced Polymer, LLC, Alpharetta, Georgia, USA |
| Polyethersulfone (PES, Radel A-300PNT) | 25667-42-9 | Amoco Polymer Inc., Alpharetta, Georgia, USA |
| Aluminum nitride (nano-powder <100 nm particle size) | 24304-00-5 | Aldrich Chemical Company, Inc., Germany |
| Boron nitride (powder, ~1 μm, 98%) | 246-140-8 | Aldrich Chemical Company, Inc., Germany |
| Copper (II) oxide (nano-powder <50 nm particle size) | 1317-38-0 | Aldrich Chemical Company, Inc., Germany |
| Silicone carbide (powder, ~1 μm, 98%) | | |
| Iron (powder, ~1 μm, 98%) | | |

TABLE 1-continued

Materials Used in this Example

| Material description | CAS number | Source |
|---|---|---|
| Aluminum (powder, ~1 μm, 98%) | | |

SMMs Synthesis

Figure 2:
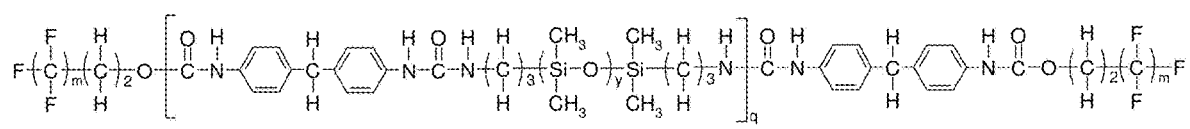
FIG. 2 shows an example of the chemical structure of SMMs, nSMM1 and SMM2.
Figure 2:
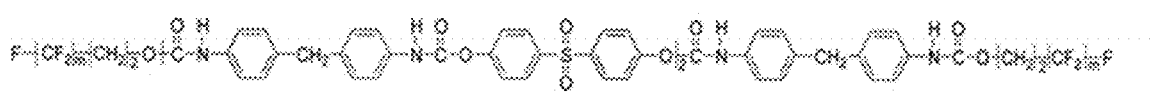

The SMMs were synthesized using the two-step solution polymerization method (Qtaishat, Khayet & Matsuura, 2011). In this example, the first polymerization step was conducted in a solution of a predetermined composition to form polyurea by the reaction of MDI with PDMS or DPS as a pre-polymer, DMAc was used as solvent. In the second polymerization step, the pre-polymer was end-capped by the addition of BAL, resulting in a solution of SMM having the structure shown in FIG. 2. The composition of SMM was 2 MDI: 1 PDMS: 2 BAL or 3MDI: 2DPS: 2BAL, The synthesized SMMs are named hereinafter nSMM1 and SMM2.

SMMs Characterization

The elemental analysis of fluorine content in nSMM1 was carried out using standard method in ASTM D3761. An accurate weight (10-50 mg) of sample was placed into oxygen flask bomb combustion (Oxygen Bomb calorimeter, Gallenkamp). After pyro-hydrolysis, the fluorine (ion) was measured by an ion chromatography (Ion Chromatograph, Dionex DX1000).

The glass transition temperature ($T_g$) of synthesized SMMs was measured by differential scanning calorimeter and the weight average molecular weight of the synthesized SMMs was measured by gel permeation chromatography (GPC).

Membrane Preparation

The composite mixed matrix membranes were prepared in a single casting step by the phase inversion method. Ethanol was used as a non-solvent additive. A predetermined amount of PS or PES was dissolved in a NMP/ethanol mixture, the nSMM1 was added to the PS solution to a constant concentration of 1.5 or 2 wt %. The resulting mixtures were stirred in an orbital shaker at room temperature for at least 48 h, then 5 wt % of inorganic nano-particles were added to the polymer solution, and the solution was further stirred for 24 hours. The resulting solution is polymer-inorganic dispersion where the inorganic nano-particles are suspended. The PS and PES concentration in the solution was varied in a range of 12-14 wt %. The ethanol concentration was 10 wt %. The polymer solutions were cast on a smooth glass plate to a thickness of 0.25 mm using a casting rod at room temperature. The resulted cast films were allowed to evaporate at room temperature for a predetermined period in order to settle the inorganic nano-particles to the bottom of the films and to allow the SMMs to migrate to the top air/polymer interface. The solvent evaporation volume was controlled by covering the cast film with a cover of 2 mm displacement, which hindered the evaporation of the solvent but allowed the SMM to migrate to the air/polymer interface as well as settling the inorganic nano-particles in the bottom of the cast film. Then, the cast films together with the glass plates were immersed for 1 h in tap water at room temperature. During gelation, it was observed that the membranes peeled off from the glass plate spontaneously. All the membranes were then dried at ambient conditions for 3 days. Table 2 shows the prepared membranes, their materials of construction and preparation conditions.

TABLE 2

Membrane preparation details: casting solution composition and preparation conditions[‡]

| Membrane code | Polymer type & concentration | SMM type & Concentration | Solvent evaporation time | Mixed matrix Nano-Particles type and concentration |
|---|---|---|---|---|
| MC1 | PS: 12 wt % | nSMM1: 1.5 wt % | 1 minute | None |
| MC2 | PS: 12 wt % | nSMM1: 1.5 wt % | 1 minute | Copper oxide: 5 wt % |
| MC3 | PS: 14 wt % | nSMM1: 1.5 wt % | 1 minute | None |
| MC4 | PS: 14 wt % | nSMM1: 1.5 wt % | 1 minute | Copper oxide: 5 wt % |
| MC5 | PS: 14 wt % | nSMM1: 1.5 wt % | 1 minute | Boron nitride: 5 wt % |
| MC6 | PS: 14 wt % | nSMM1: 1.5 wt % | 1 minute | Aluminum nitride: 5 wt % |
| MC7 | PES: 14 wt % | nSMM1: 1.5 wt % | 1 minute | None |
| MC8 | PES: 14 wt % | nSMM1: 1.5 wt % | 1 minute | Copper oxide: 5 wt % |
| MC9 | PES: 14 wt % | nSMM1: 1.5 wt % | 1 minute | Boron nitride: 5 wt % |
| MC10 | PES: 14 wt % | nSMM1: 1.5 wt % | 1 minute | Aluminum nitride: 5 wt % |
| MC11 | PES: 12 wt % | SMM2: 2 wt % | 10 minutes | Iron: 4 wt % |
| MC12 | PES: 12 wt % | SMM2: 2 wt % | 5 minutes | Iron: 4 wt % |
| MC13 | PES: 12 wt % | SMM2: 2 wt % | 10 minutes | Iron: 2 wt % |
| MC14 | PES: 12 wt % | SMM2: 2 wt % | 5 minutes | Iron: 2 wt % |
| MC15 | PES: 12 wt % | SMM2: 2 wt % | 10 minutes | Aluminum: 2 wt % |
| MC16 | PES: 12 wt % | SMM2: 1.5 wt % | 10 minutes | Aluminum: 4 wt % |
| MC17 | PES: 12 wt % | SMM2: 2 wt % | 10 minutes | Aluminum: 1 wt % |
| MC18 | PES: 12 wt % | SMM2: 1.5 wt % | 10 minutes | Silicone carbide: 5 wt % |
| MC19 | PES: 12 wt % | SMM2: 1.5 wt % | 5 minutes | Aluminum: 4 wt % |
| MC20 | PES: 12 wt % | SMM2: 2 wt % | 5 minutes | Aluminum: 1 wt % |
| MC21 | PES: 12 wt % | SMM2: 2 wt % | 5 minutes | Aluminum: 1 wt % |
| MC22 | PES: 12 wt % | SMM2: 1.5 wt % | 5 minutes | Silicone carbide: 5 wt % |
| MC23 | PES: 12 wt % | SMM2: 2 wt % | 0 minutes | None |
| MC24 | PES: 12 wt % | SMM2: 2 wt % | 5 minutes | None |

[‡]Ethanol (non-solvent additive) concentration, 10 wt %; gelation bath (tap water) temperature: 20° C.

Membrane Characterization

1. Scanning Electron Microscopy (SEM)

The cross-section of the SMMs blended PEI membranes was analyzed by scanning electron microscopy, SEM, (JSM-6400 JEOL, Japan). The membranes were cut into pieces (3 mm width and 10 mm length) and subsequently immersed in liquid nitrogen reservoir for 5 s. While keeping the pieces in the liquid nitrogen, those were broken into two pieces by pulling from both ends. One of the broken pieces was mounted on metal plate with carbon paste and gold-coated prior to use. The cross-section of the membranes at the broken parts was finally examined by SEM.

2. X-ray Photoelectron Spectroscopy (XPS)

The elemental composition at the surface of each SMM blended membrane was determined by X-ray photoelectron spectroscopy (XPS, Kratos Axis HS X-ray photoelectron spectrometer, Manchester, UK). Each membrane was cut into samples of 1 cm² from random positions of the membrane. Monochromatized Al $K_\alpha$ X-radiation was used for excitation and a 180° hemispherical analyzer with a three channel detector was employed. The X-ray gun was operated at 15 kV and 20 mA. The pressure in the analyzer chamber was $1.33 \times 10^{-4}$ to $1.33 \times 10^{-5}$ Pa. The size of the analyzed area was about 1 mm². All the membrane samples were analyzed for fluorine content at both top and bottom sides.

3. Mechanical Tests:

Tensile testing was performed at room temperature on an Instrom dynamometer model 4301, according to ASTM D638M (standards). Tests were carried out with a crosshead speed of 50 ml/min at break. At least three measurements were performed for each membrane sample and the average values are reported in this study. The mechanical properties of the membranes are given in terms of Young's modulus, maximum strength and the percent elongation at break.

Direct Contact Membrane Distillation Experiments

The prepared composite mixed matrix were tested by the direct contact membrane distillation (DCMD) setup shown in FIG. 3 and detailed elsewhere (Khayet & Matsuura, 2011).

Results and Discussion

Mixed Matrix Composite Membranes Characterization

Figure 4:
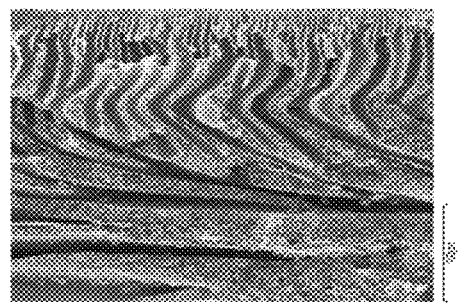
FIG. 4 shows SEM pictures of the cross-section of composite mixed matrix and polymeric membranes: (a) MC3; (b) MC4; (c) MC5; (d) MC6; (e) MC8; (f) MC9; (g) MC10; (h) MC14; (i) MC16; (j) MC21; (k) MC22
Figure 4:
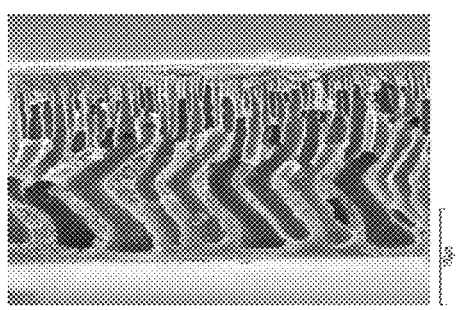
Figure 4:
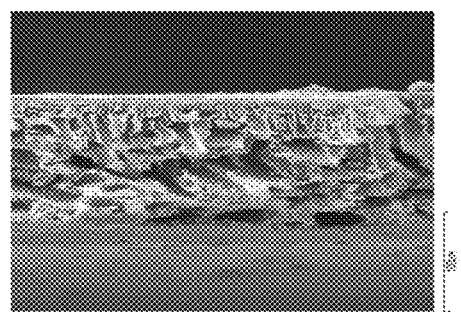
Figure 4:
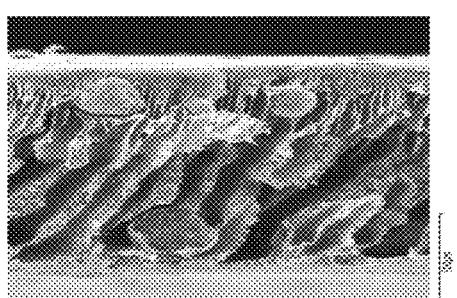
Figure 4:
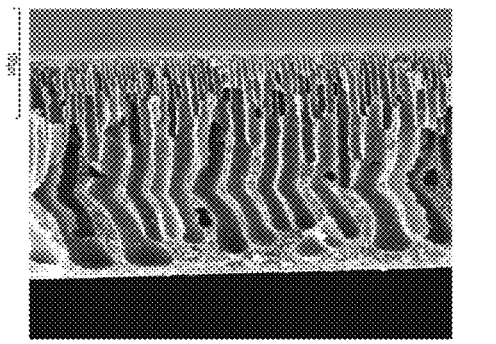
Figure 4:
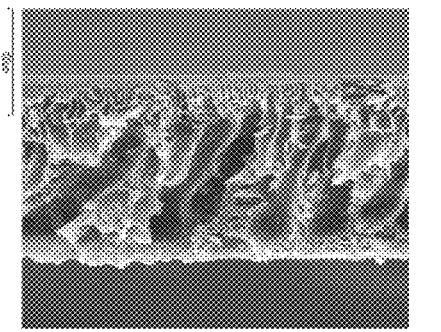
Figure 4:
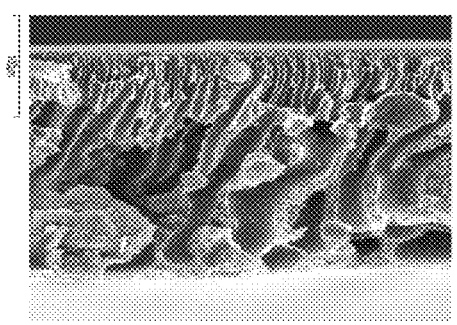

The cross-section SEM images of the mixed matrix membranes are shown in FIG. 4. As can be seen, all the membranes are of asymmetric structure with a denser structure at the top surface, whereas the structure of the bottom surface varies depending on the existence of the mixed matrix nano-particles and its type. In the membrane where there is no mixed matrix nano-particles (MC3 in FIG. 4), horizontal micro-voids were formed interrupted by sponge-like layers in between. However, when adding mixed matrix nano-particles to the composite membrane polymer solution, macro-voids were vertical reaching the bottom of the membrane (MC5 in FIG. 4 is a noted exception). For instance, in the case of copper oxide (MC4 and MC8 in FIG. 4) small macro-voids grown in vertical direction are separated by vertical sponge-like polymer layers, similar trend was obtained in MC16 and MC22. When boron nitride was used as dispersed nano-particle (MC5 and MC9 in FIG. 4), it was noticed that the finger like structure became irregular in the middle section and large macro-voids were formed at the bottom, similar trend was obtained in MC14 and MC21. Finally, in the case of aluminum nitride (MC6 and MC10 in FIG. 4), it was noticed that there are polymer nuclei formed in different positions at the hydrophilic layer.

Figure 5:
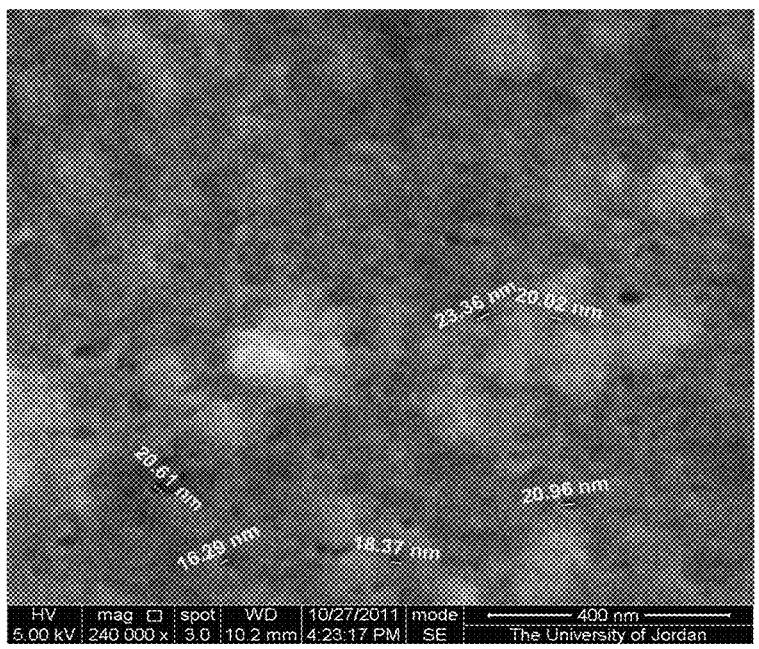
FIG. 5 shows SEM pictures of the top and bottom surface of composite mixed matrix membrane MC17.
Figure 5:
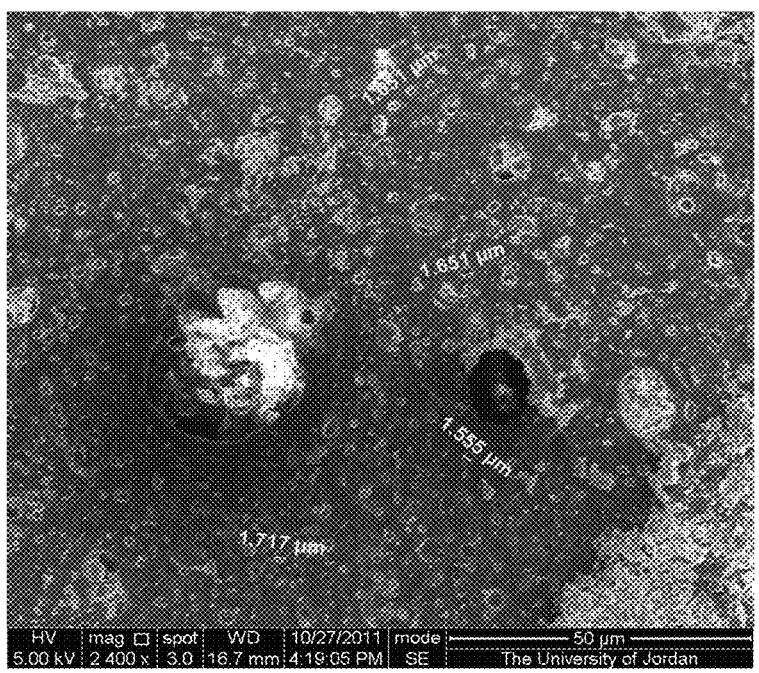

FIG. 5 shows the SEM images of the top and bottom surfaces of the mixed matrix membranes, in which MC17 was taken as an example. The images showed that the top surface pore size was an order of magnitudes lower than that of the bottom surface. Quantitatively, the range of pore size in the top surface was around 20 nm, on the other hand it was around 1.6 μm.

Figure 6:
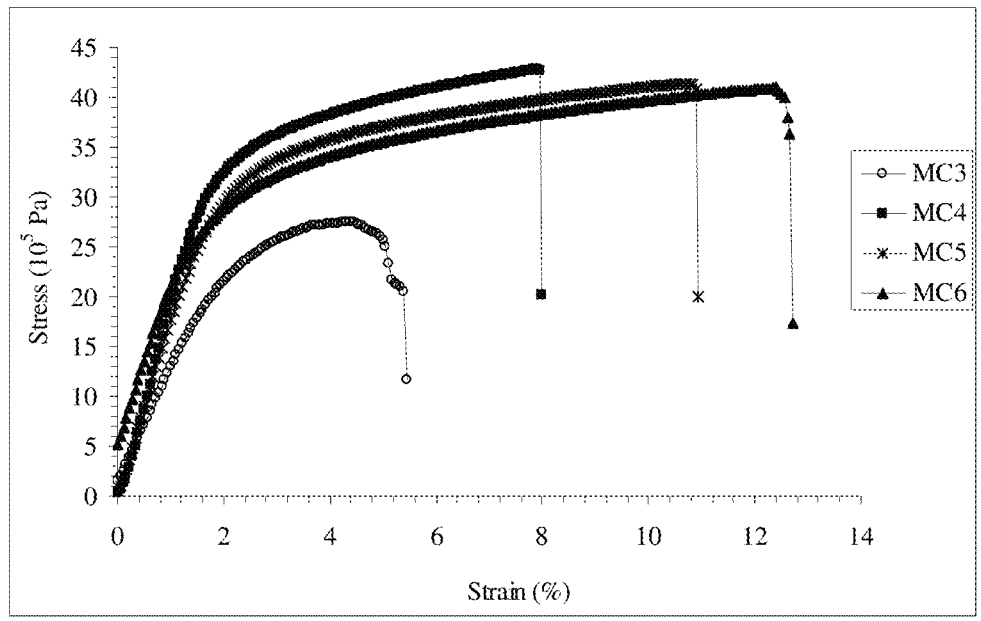
FIG. 6 shows tensile stress-strain curves of the composite mixed matrix and polymeric membranes.
Figure 6:
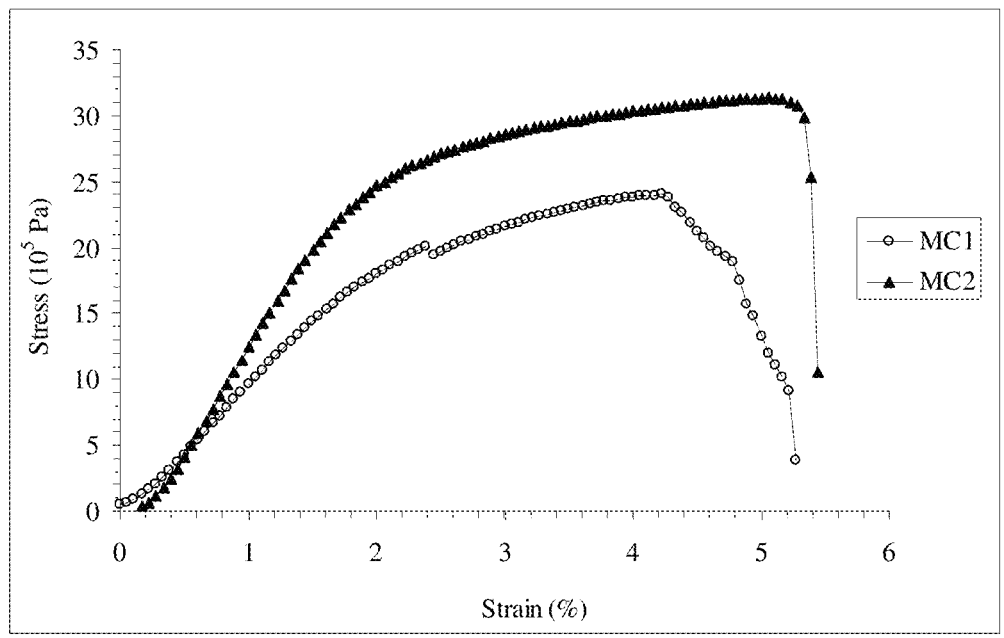

The mechanical properties of the composite mixed matrix membranes are summarized in Table 3 and examples of deformation behaviors are shown in FIG. 6. When using the same polymer PS with the same concentration in the dope (MC3, MC4, MC5, MC6), the Young's modulus, maximum strength and the percent elongation at break of the composite mixed matrix membranes (MC4, MC5, MC6) are higher than those of the non-mixed matrix membrane MC3 (See FIG. 6a). Similarly, when using 12 wt % of PS in the dope, the mechanical properties improved by the dispersion of the mixed matrix nano-particles in the dope. The composite mixed matrix membrane MC2 exhibits better mechanical parameters than the non-mixed matrix membrane MC1 (see Table 3 and FIG. 6b). The same behavior was observed for the polymer PES when comparing the membrane MC7 and MC8 (see Table 3 and FIG. 6c). However, the mechanical properties of the PS membranes are better than those of the PES membranes.

TABLE 3

Mechanical properties of the composite mixed matrix membranes.

| Membrane code | Young's Modulus (MPa) | Maximum strength (MPa) | Deformation at break (%) |
|---|---|---|---|
| MC1 | 101.6 ± 17.9 | 3.0 ± 0.3 | 5.9 ± 2.0 |
| MC2 | 126.0 ± 26.1 | 3.1 ± 0.8 | 7.4 ± 3.2 |
| MC3 | 122.1 ± 16.0 | 2.9 ± 0.5 | 6.1 ± 3.0 |
| MC4 | 177.7 ± 26.0 | 3.7 ± 0.5 | 7.4 ± 7.5 |
| MC5 | 159.3 ± 14.8 | 3.8 ± 0.5 | 10.3 ± 4.4 |
| MC6 | 171.2 ± 6.6 | 4.3 ± 0.3 | 8.9 ± 3.2 |
| MC7 | 67.7 ± 16.2 | 2.8 ± 0.6 | 5.9 ± 3.6 |
| MC8 | 139.9 ± 23.3 | 3.1 ± 0.8 | 6.1 ± 2.7 |

Membrane Performance

FIGS. 7-11 show the DCMD fluxes of the prepared mixed matrix composite membranes. FIGS. 7a, 8a, and 9a show the DCMD flux versus the average temperature of feed and permeate solutions ($T_m$) when distilled water was used as feed, while FIGS. 7b, 8b and 9b show the DCMD flux of the same membranes when using 0.5M NaCl aqueous solution as feed. However, in FIGS. 11 and 12 the effect of the mean temperature on the DCMD flux of distilled water and 0.5M NaCl solution is shown as well as on the separation factor.

As shown in the figures; all the membranes exhibit an exponential increase of the DCMD flux with an increase in $T_m$. This is attributed to the exponential increase of the vapor pressure with the increase of temperature according to Antoine equation.

When considering the addition of the inorganic nano-particles; it was noticed that the DCMD permeate flux increased dramatically. For example, under the same DCMD operating conditions, for the 12 wt % PS membranes permeate flux increased by 50% when copper oxide was added (See FIG. 7a). In FIG. 8a, similarly, the permeate flux increased for the 14 wt % PS membranes by 200% when the copper oxide and boron nitride were added as inorganic nano-particles. This trend was further verified when PES was used as the base hydrophilic polymer. FIG. 9a shows that the permeate flux of 14 wt % PES membranes increased by 120% when copper oxide was added.

Figure 7:
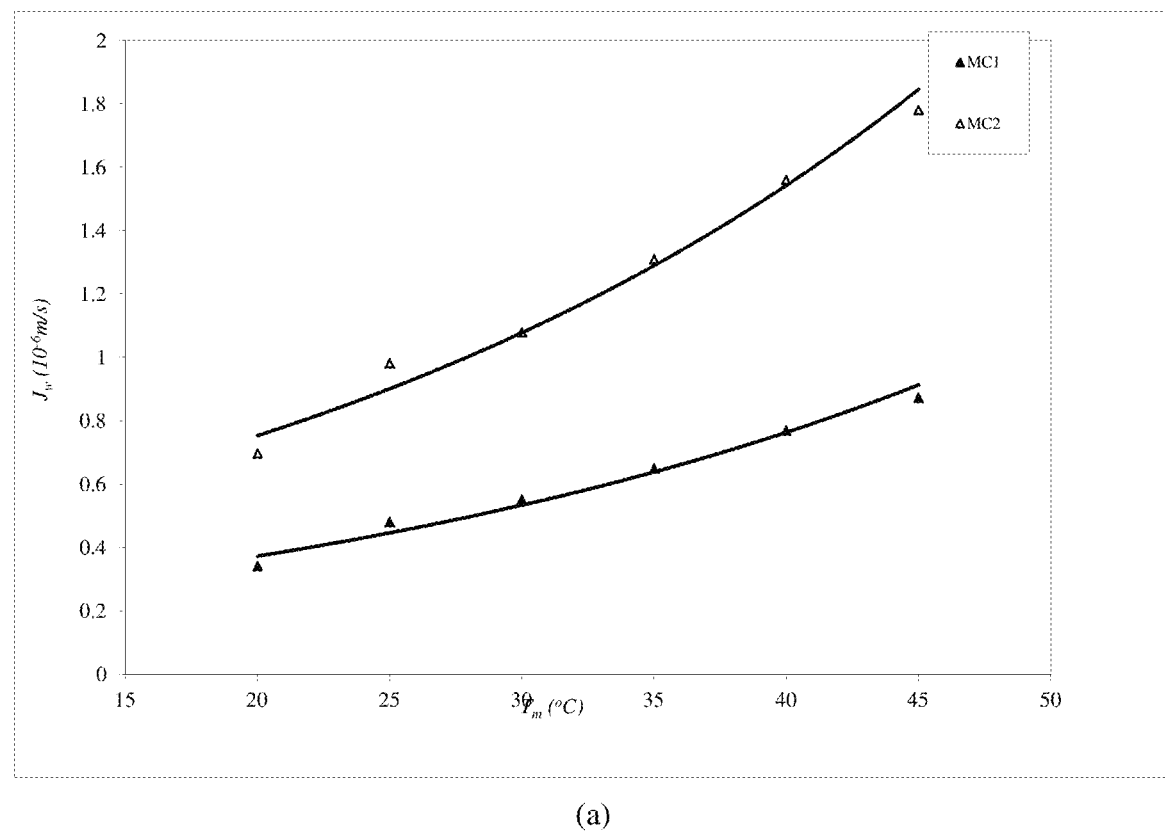
FIG. 7 graphically depicts the effect of copper oxide addition on 12 wt % PS membrane performance in DCMD: (a) mean temperature effect on DCMD permeate flux of distilled water feed solution; (b) water vapour DCMD flux of 0.5 M NaCl feed solution at $T_f$ of 65° C. and $T_p$ of 15° C.
Figure 7:
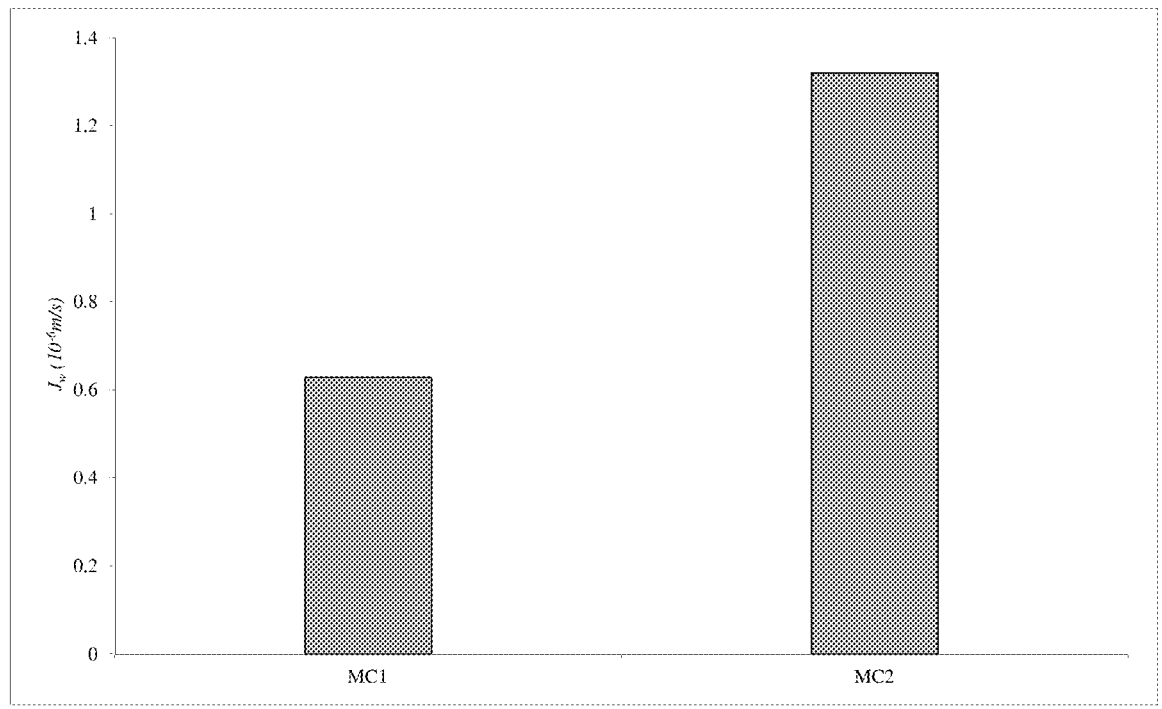
Figure 8:
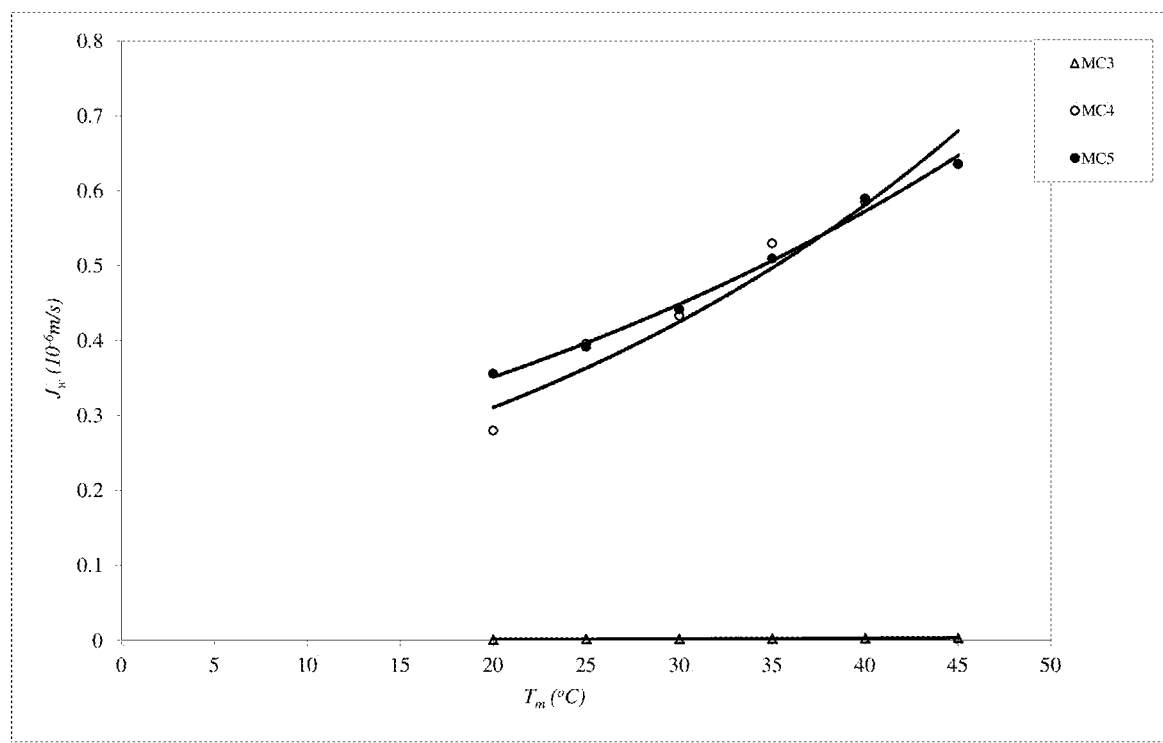
FIG. 8 graphically depicts the effect of copper oxide and boron nitride addition on 14 wt % PS membrane performance in DCMD: (a) mean temperature effect on DCMD flux of distilled water feed solution; (b) water vapour DCMD flux of 0.5 M NaCl feed solution at $T_f$ of 65° C. and $T_p$ of 15° C.
Figure 8:
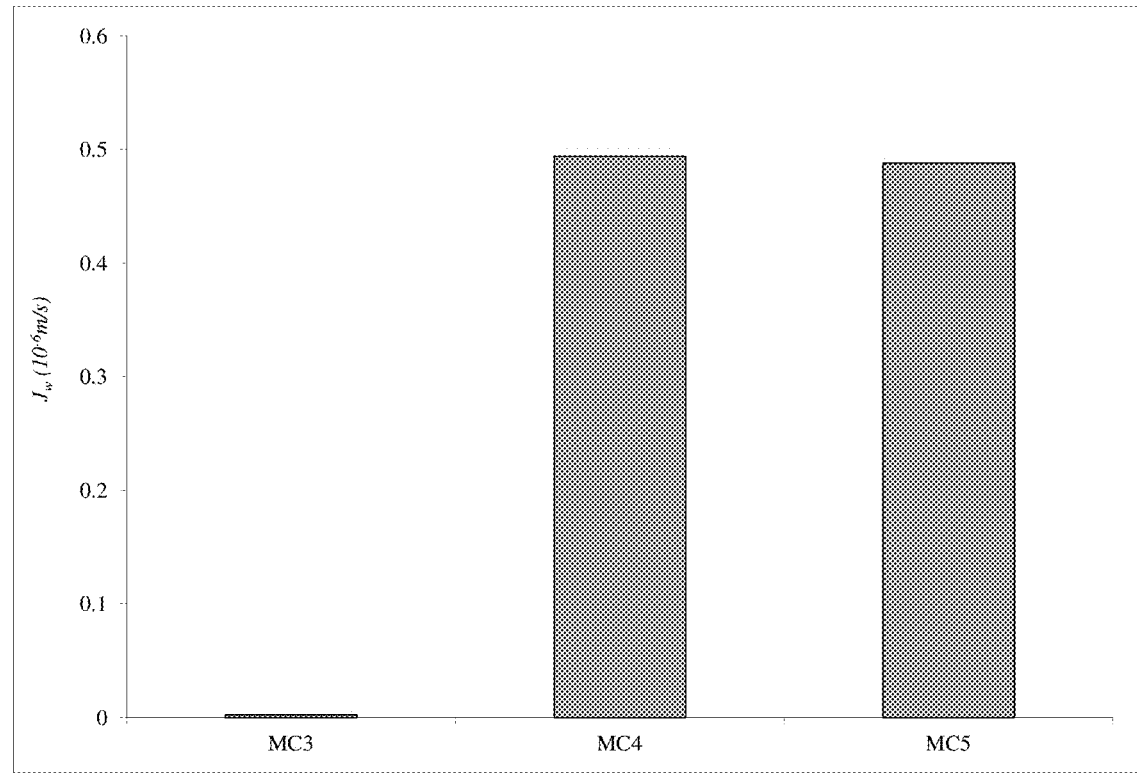
Figure 9:
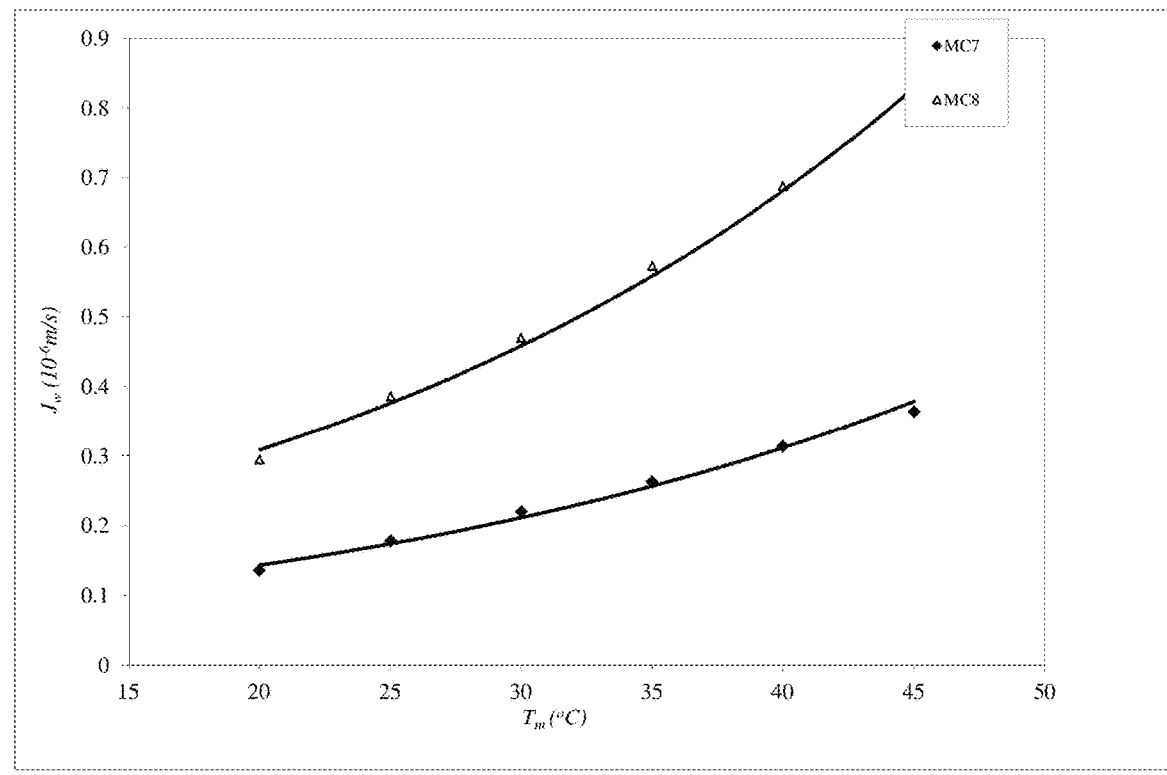
FIG. 9 graphically depicts the effect of copper oxide addition on 14 wt % PES membrane performance in DCMD: (a) mean temperature effect on DCMD flux of distilled water feed solution; (b) water vapour DCMD flux of 0.5 M NaCl feed solution at $T_f$ of 65° C. and $T_p$ of 15° C.
Figure 9:
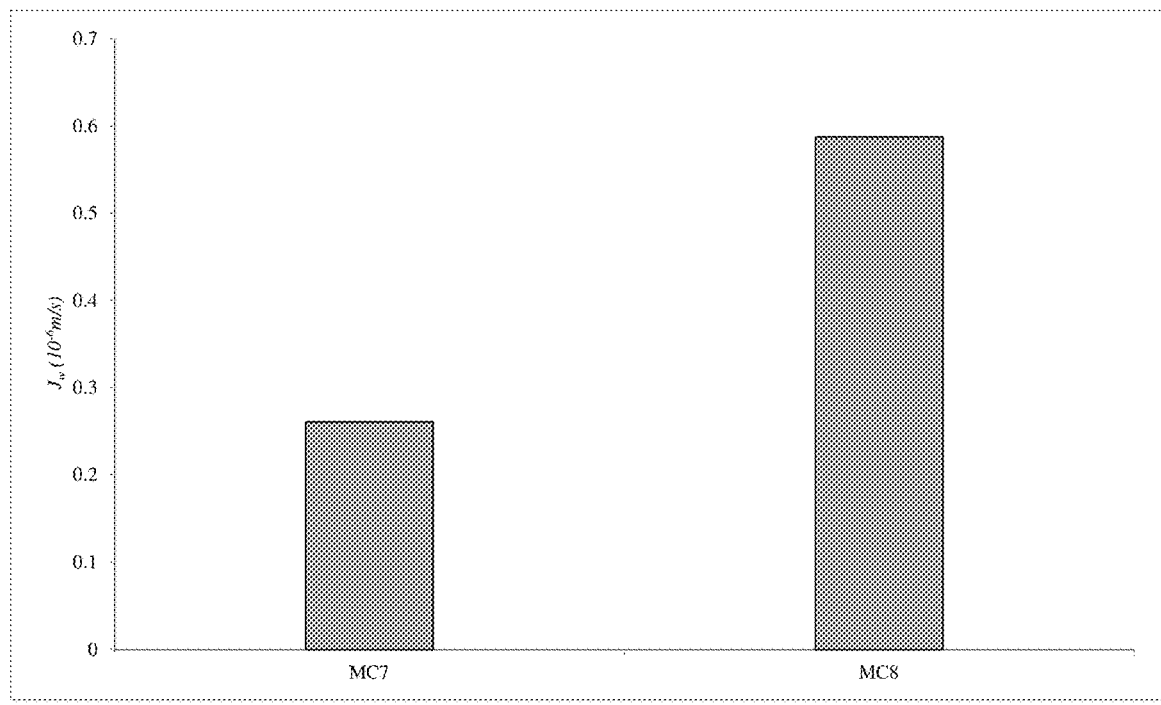
Figure 10:
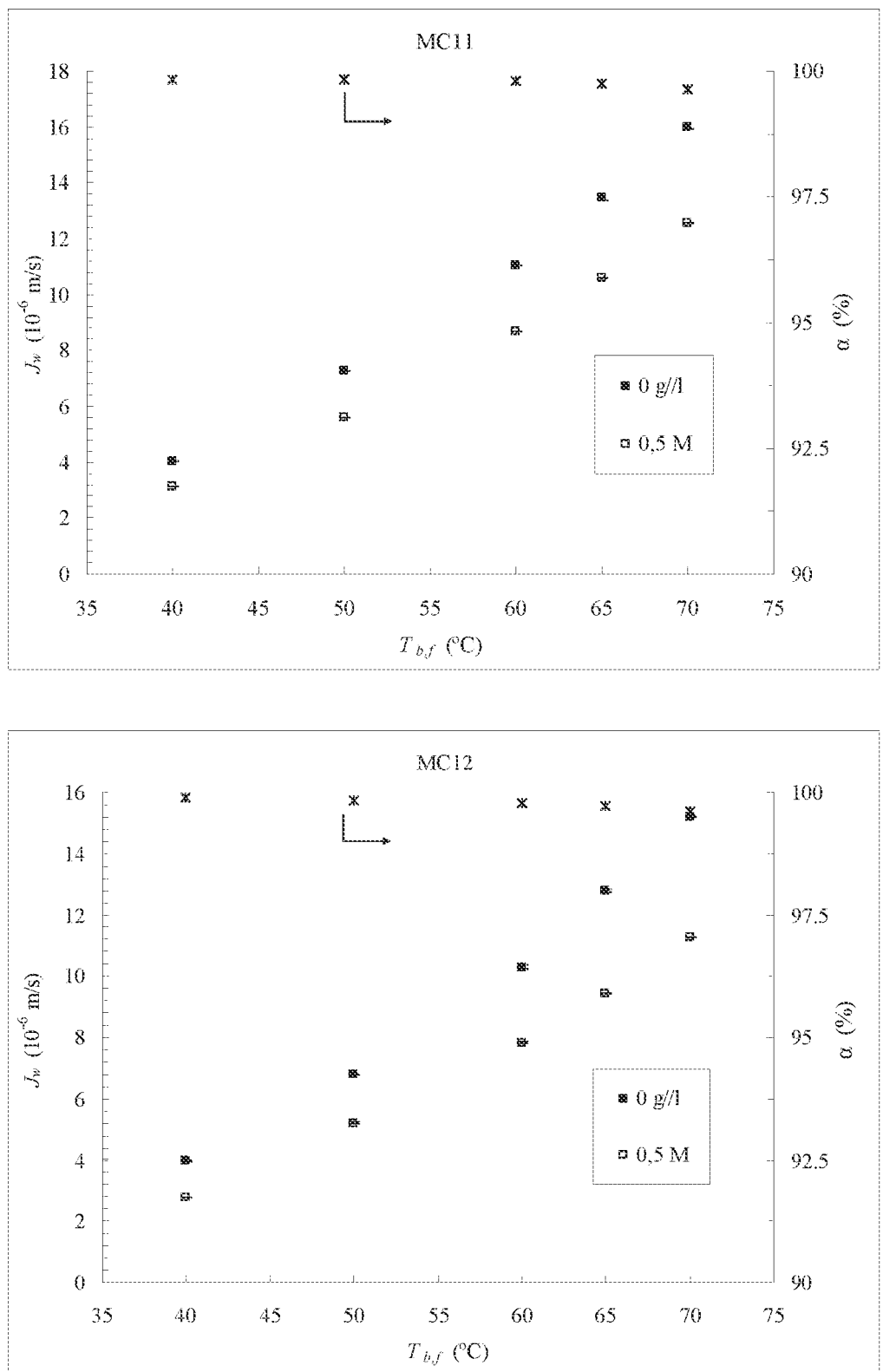
FIG. 10 graphically depicts the effect of mean temperature on DCMD flux of both distilled water and 0.5 M NaCl solutions as well as on the separation factor for MC11 and MC12 membranes in which iron was used as nano-particles.
Figure 11:
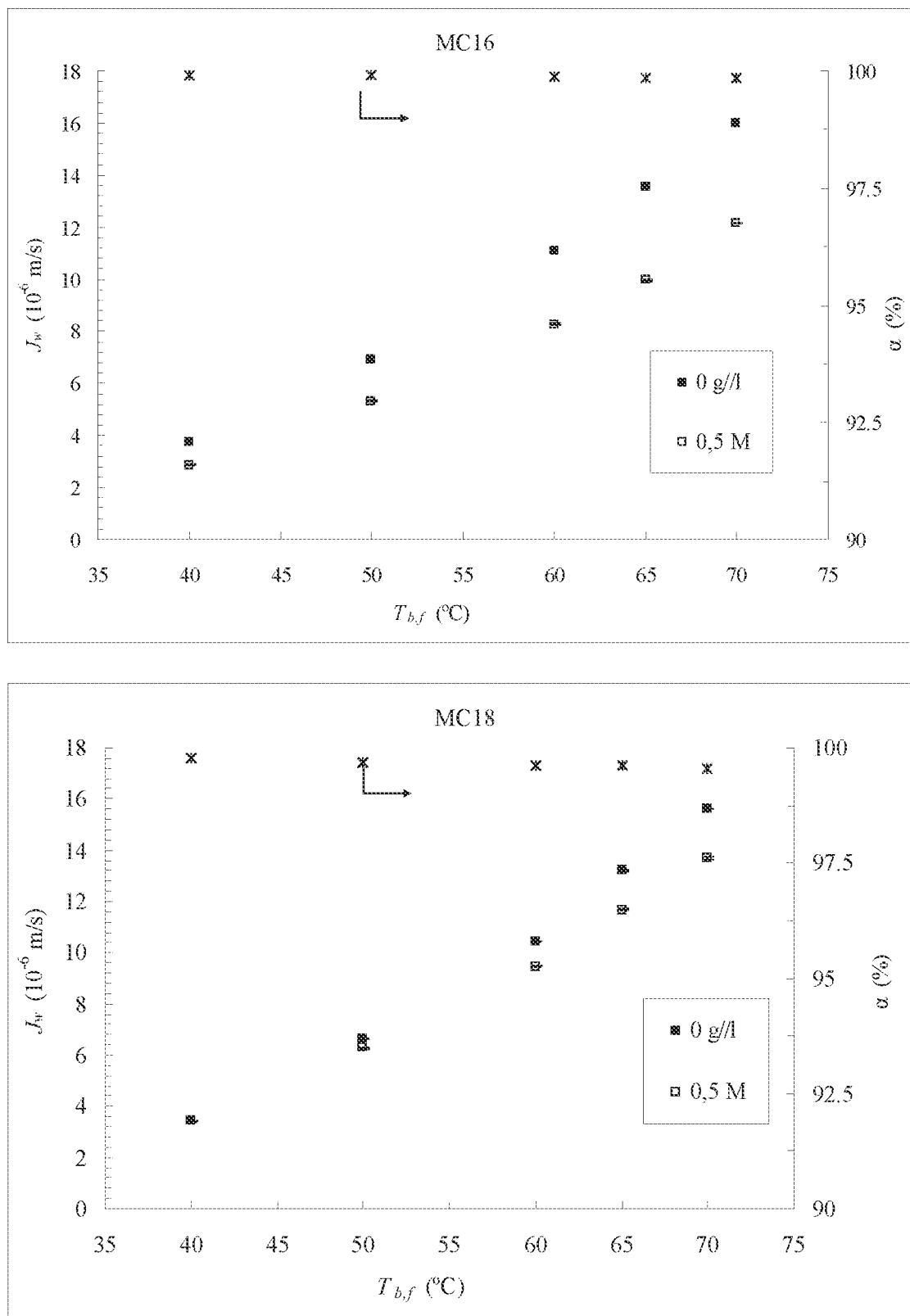
FIG. 11 graphically depicts the effect of mean temperature on DCMD flux of both distilled water and 0.5 M NaCl solutions as well as on the separation factor for MC16 and MC18 membranes in which aluminum and silicone carbide was used as nano-particles, respectively.

The most significant results are those shown in FIGS. 10 and 11 in which iron, aluminum and silicone carbide was used as nano-particles, since the reported flux data were order of magnitudes higher than that shown in FIGS. 7-9. However, it is not believed that the nano-particle type was the responsible for this trend. It was the manufacturing technique differences, since MC11, 12, 16 and 18 were prepared using the cover as detailed earlier in the membrane preparation section.

In conclusion, all the prepared mixed matrix composite membranes exhibited higher permeate flux than the polymeric composite membranes. Furthermore, all tested membranes exhibit salt (NaCl) rejection factors higher than 99.9%.

CONCLUSIONS

This example provides a proof for the claim that increasing the hydrophilic layer thermal conductivity leads to a dramatic increase of the DCMD permeate flux of the composite hydrophobic/hydrophilic membrane. This is attributed to the thermal conductivity of the hydrophilic layer that is increased by dispersing inorganic nano-particles into the polymer dope used to cast the mixed matrix hydrophobic/hydrophilic composite membrane.

The mixed matrix composite membranes exhibit better mechanical properties than the composite hydrophobic/hydrophilic membranes prepared without nano-particles.

The prepared mixed matrix composite membranes are destined to play a key role in the future development and commercialization of the membrane distillation (MD) process.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A membrane distillation system comprising:
a composite mixed matrix membrane which is a flat-sheet composite mixed matrix hydrophilic/hydrophobic membrane having at least a hydrophilic layer and a hydrophobic layer, wherein
the composite mixed matrix membrane comprises pores that extend entirely through the hydrophobic layer,
the composite mixed matrix membrane is configured so that vapor transport through the pores takes place predominantly via Knudsen type of flow,
the hydrophobic layer being configured permeability to water vapor and impermeability to liquid water,
the hydrophilic layer comprises a hydrophilic polymer and inorganic nano-particles of high thermal conductivity selected from the group consisting of copper oxide, boron nitride, aluminum nitride, aluminum, iron, and silicon carbide,
the hydrophobic layer comprises a fluorinated surface-modifying macromolecule (SMM),
the composite mixed matrix membrane is obtained by a phase inversion process that includes (i) dispersing the inorganic nano-particles in a solution comprising the hydrophilic polymer, a non-solvent additive, the SMM, and a solvent to form a polymer-inorganic dispersion, (ii) casting the polymer-inorganic dispersion in a form of a flat sheet having a first main surface and a second main surface, and (iii) allowing or causing the SMM to migrate toward the first main surface and the inorganic nano-particles to migrate toward the second main surface,
a content of the inorganic nano-particles in the polymer-inorganic dispersion is from 1 wt % to 5 wt % when a total weight of the polymer-inorganic dispersion is considered to be 100 wt %, the hydrophilic polymer is selected from the group consisting of polysulfone, polyethersulfone, polyetherimide, and cellulose acetate, the composite mixed matrix membrane is configured to have a vapor permeate flux of at least $0.35 \times 10^{-6}$ m/s for distilled water solution at a mean temperature of 25° C. when copper oxide is the inorganic nanoparticle, the composite mixed matrix membrane is configured to have a vapor permeate flux of at least $0.35 \times 10^{-6}$ m/s for distilled water solution at a mean temperature of 25° C. when boron nitride is the inorganic nanoparticle, the composite mixed membrane is configured to have a vapor permeate flux of at least $0.35 \times 10^{-6}$ m/s for distilled water solution at a bulk solution feed temperature of 40° C. when iron is the inorganic nanoparticle, the composite mixed matrix membrane is configured to have a vapor permeate flux of at least $0.35 \times 10^{-6}$ m/s for distilled water solution at a bulk solution feed temperature of 40° C. when Aluminum is the inorganic nanoparticle, and the composite mixed matrix membrane is configured to have a vapor permeate flux of at least $0.35 \times 10^{-6}$ m/s for distilled water solution at a bulk solution feed temperature of 40° C. when silicon carbide is the inorganic nanoparticle.

2. The membrane distillation system as claimed in claim 1, wherein said fluorinated surface-modifying macromolecules (SMM) are oligomeric fluoropolymers synthesized using polyurethane chemistry, the surface-modifying macromolecules comprise fluorinated end-groups.

3. The membrane distillation system as claimed in claim 1, wherein said flourinated SMM is selected from the group consisting of flourinated poly(urethane propylene glycol) and flourinated poly(urea dimethylsiloxane urethane).

4. The membrane distillation system as claimed in claim 1, wherein a content of the hydrophilic polymer in the polymer-inorganic dispersion is 12 wt % to 14 wt % when the total weight of the polymer-inorganic dispersion is considered to be 100 wt %.

5. The membrane distillation system as claimed in claim 1, wherein the hydrophilic polymer is polysulfone, and a content of the polysulfone in the polymer-inorganic dispersion is 12 wt % to 14 wt % when the total weight of the polymer-inorganic dispersion is considered to be 100 wt %.

6. The membrane distillation system as claimed in claim 1, wherein the hydrophilic polymer is polyethersulfone, and a content of the polyethersulfone in the polymer-inorganic dispersion is 12 wt % to 14 wt % when the total weight of the polymer-inorganic dispersion is considered to be 100 wt %.

* * * * *